United States Patent [19]
Breeuwer et al.

[11] Patent Number: 5,917,609
[45] Date of Patent: Jun. 29, 1999

[54] HYBRID WAVEFORM AND MODEL-BASED ENCODING AND DECODING OF IMAGE SIGNALS

[75] Inventors: Marcel Breeuwer; Petrus J. Van Otterloo, both of Eindhoven, Netherlands

[73] Assignee: U.S. Philips Corporation, New York, N.Y.

[21] Appl. No.: 08/712,982

[22] Filed: Sep. 12, 1996

[30] Foreign Application Priority Data

Sep. 12, 1995 [EP] European Pat. Off. .............. 95202466

[51] Int. Cl.⁶ .......................... H04N 1/417; H04N 1/419; H04N 1/415; G06K 9/36
[52] U.S. Cl. .................................. 358/261.2; 358/261.2; 358/261.1; 358/261.3; 382/238
[58] Field of Search .............................. 358/261.2, 261.1, 358/261.3; 382/238

[56] References Cited

U.S. PATENT DOCUMENTS

| 5,117,287 | 5/1992 | Koike et al. | 358/133 |
|---|---|---|---|
| 5,592,228 | 1/1997 | Dachiku et al. | 348/416 |

FOREIGN PATENT DOCUMENTS

0614318A2   9/1994   European Pat. Off. .

OTHER PUBLICATIONS

"Model–Based/Waveform Hybrid Coding for Videotelephone Images", by Y. Nakaya et al, IEEE Conf. on Acoustics, Speech and Signal Processing (ICASSP) 91, vol. 4, 1991, pp. 2741–2744.

"On Adaptive DCT Coding Techniques for Digital Video Recording", IERE Proc., 7th Int. Conf. Video, Audio and Data Recording, Mar. 22–24, York U.K., pp. 199–204.

"The LOT: Transform Coding Without Blocking Effects", IEEE Trans. on Acoustics, Speech and Signal Processing, vol. 37, No. 4, Apr. 1989.

*Primary Examiner*—Edward L. Coles
*Assistant Examiner*—Twyler Lamb
*Attorney, Agent, or Firm*—Laurie E. Gathman

[57] ABSTRACT

A hybrid waveform and model-based image signal encoder and decoder are described. The image signal is waveform-encoded (11) and decoded (31) so as to approximate the waveform of the original input signal as well as possible after compression. In order to compensate its loss, the noise component of the signal (or, more generally, a signal component which gets lost by the waveform encoding) is model-based encoded (12,13) and separately transmitted or stored. In the decoder, the noise is regenerated (32–34) and added (36) to the waveform-decoded image signal. The invention is particularly applicable to compression of medical X-ray angiographic images where loss of noise leads a cardiologist or radiologist to believe that the image is distorted.

18 Claims, 4 Drawing Sheets

HYBRID WAVEFORM AND MODEL-BASED ENCODING AND DECODING OF IMAGE SIGNALS

FIELD OF THE INVENTION

The invention relates to a hybrid waveform and model-based encoder and decoder for encoding and decoding image signals. The invention also relates to a method of transmitting image signals. Transmission is herein also understood to mean the storage of encoded image signals on storage media such as optical or magnetic discs and tapes. The invention is particularly applicable to encoding and compressing medical X-ray angiographic image series.

BACKGROUND OF THE INVENTION

Waveform encoding is a well-known encoding technique used for transmitting of video images. The object of waveform encoding is to approximate the waveform of the original input signal as well as possible at the available bitrate. The quality of the reconstructed signal generally decreases with a decreasing bitrate. Waveform encoders often apply the technique of transform coding. The widely accepted MPEG standard, for example, applies a Discrete Cosine Transform (DCT) to pixel blocks, and quantizes and variable-length codes the coefficients obtained from said transform. Other transforms are currently being investigated. For example, the overlapped transform, e.g. the Lapped Orthogonal Transform (LOT), promises to be suitable for encoding and compressing medical X-ray images. Even at very high compression ratios, the relevant clinical information seems to be present in the compressed images.

Model-based coding is a relatively new concept of image data compression. In model-based coding, the original input signal is first modeled, and quantized versions of the model parameters are transmitted to the decoder. Instead of producing a replica of the original waveform, the decoder generates a signal which looks very similar to the original signal, but may have a completely different waveform. A very high compression ratio can be achieved, with model-based coding.

Known hybrid waveform and model-based encoders and decoders are disclosed in "Model-based/waveform hybrid coding for videotelephone images", International Conference on Acoustics, Speech and Signal Processing (ICASSP) 91; Vol.4; 1991; pp. 2741–2744. The known arrangement applies model-based coding to head-and-shoulder images, and waveform encoding to the background image which cannot be modeled. The waveform coding is also used to cancel errors of the model-based analysis system.

OBJECT AND SUMMARY OF THE INVENTION

It is an object of the invention to further improve the image quality of waveform-encoded images, in particular medical X-ray images.

According to the invention, a hybrid waveform and model-based encoder is provided for encoding an image signal, comprising a waveform encoder for waveform-encoding the image signal and a model-based encoder for model-based encoding a component of the image signal, at least in as far as said component is absent in the waveform-encoded image signal.

The invention is based on the recognition that, at very high compression ratios, a change of the characteristics in the original images can be observed. This is caused, inter alia, by the fact that high-frequency components of the image are very coarsely quantized or even totally removed. The hybrid encoder according to the invention provides an effective and efficient way of regenerating the characteristics of said component.

More particularly, the noise in an image signal is reduced or removed by waveform encoding. This results in an impression of reduced sharpness, which is very disadvantageous in medical applications. Although most clinical information seems to be present in the decompressed X-ray angiographic images, a cardiologist will appreciate a sharp image. As he is accustomed to the presence of noise, the absence thereof leads him to believe that the image is seriously distorted. The transmission of model-based encoded noise requires an extremely low bitrate, and the noise can easily be regenerated in the decoder. Even at very high compression ratios, the original and decoded images are perceptually almost the same.

In an embodiment of the invention, the model-based encoder is arranged to encode the power spectral density of the image signal. The power spectral density of the waveform-decoded signal is determined at the receiver end. Both spectra are then compared and the difference is used to control the regeneration of noise.

In a further embodiment, the waveform-encoded signal is decoded at the transmitter end, and the difference between the original image signal and the waveform-decoded signal is determined. Model-based encoding is then applied to said difference signal.

The image signal is Preferably subjected to transform coding. This is particularly attractive because the same transform circuit is used for both waveform encoding and model-based encoding.

It is to be noted that the above-mentioned publication "Model-based/waveform hybrid coding for videotelephone images" states that the performance of waveform encoders can be improved by the incorporation of model-based coding. However, this aspect is not further elaborated. The particular feature of applying model-based coding to a signal component, which would get lost by waveform encoding and compression, is not disclosed.

DESCRIPTION OF PREFERRED EMBODIMENTS

Figure 1:
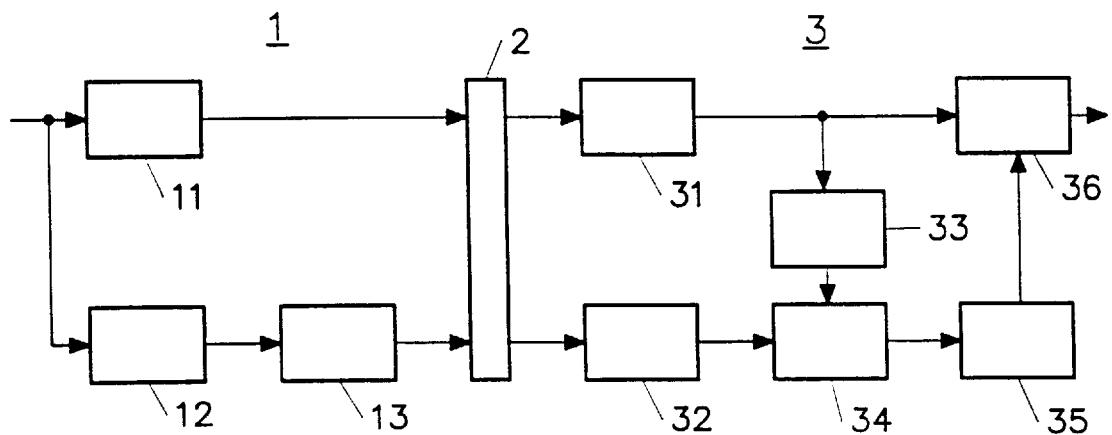
FIGS. 1 and 2 show diagrams of a first and a second embodiment of a system comprising a hybrid encoder and decoder according to the invention.

FIG. 1 shows a diagram of a first embodiment of a system comprising a hybrid encoder and decoder (herein after sometimes abbreviated to "codec") according to the invention. The system comprises a hybrid encoder 1, a transmission or storage medium 2, and a hybrid decoder 3. In the hybrid encoder, the input image signal is applied to a waveform encoder 11 and to a model-based encoder. The model-based encoder includes an estimation circuit 12 for estimating model parameters representing global information about the image signal, e.g. the shape of its power spectral density or the energy of noise components in this signal, and an encoding stage 13. The waveform-encoded signal and the model-based encoded signal are then applied to transmission or storage medium 2. In the hybrid decoder, the waveform-encoded image signal is decoded by a waveform decoder 31, 3whereas the model-based encoded signal is decoded by a decoding stage 32. The waveform-decoded signal is applied to an estimation circuit 33 which is arranged to estimate the same model parameters as are estimated by circuit 12 of the encoder. In a comparison circuit 34, the decoded model parameters are compared with the parameters calculated by estimation circuit 33. The difference thus obtained is an indication of that information which could not be represented well enough by the waveform codec. This information is regenerated in a regeneration stage 35 and added to the waveform-decoded image signal by means of an adder circuit 36.

Figure 2:
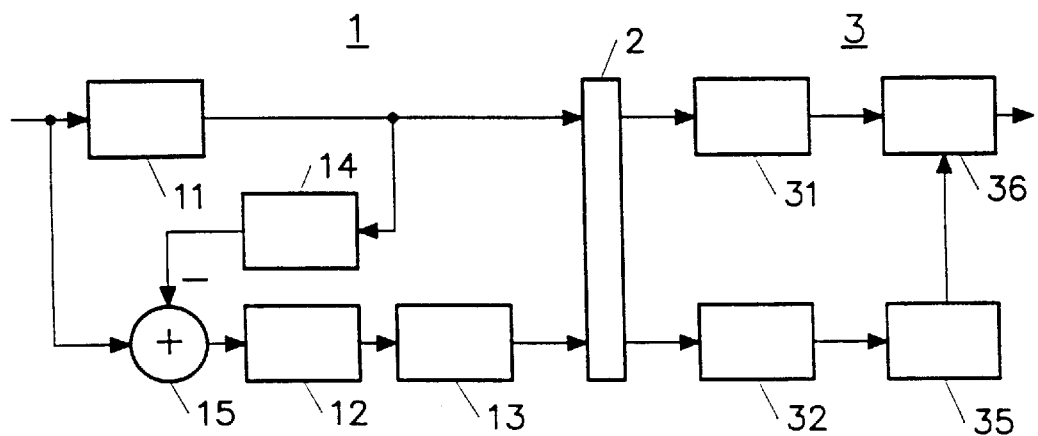

FIG. 2 shows a diagram of a second embodiment of the codec. The same reference numerals are used for the same circuit elements as shown in FIG. 1. The hybrid encoder 1 now comprises a waveform decoder 14, which locally decodes the waveformencoded image signal, and a subtracter 15 which subtracts the locally decoded waveform from the original image waveform. The model-based encoding, performed by estimation circuit 12 and encoding stage 13, is now applied to the difference signal. This embodiment is more efficient in terms of bitrate because model-based encoding is applied only in as far as the relevant component is indeed absent in the waveform-encoded signal. Moreover, the corresponding decoder is less complicated because the estimation circuit and comparison circuit (33 and 34, respectively, in FIG. 1) can now be dispensed with.

A more detailed example of model-based coding of noise will now be explained with reference to the system shown in FIG. 3. In this embodiment, the image is divided into blocks of pixels and the model-based coding of noise is applied to the transform coefficients, obtained by transform coding (e.g. DCT or LOT) said pixel blocks. The system is more or less similar to the embodiment of FIG. 1, except that the model parameters are calculated in the transform domain.

Figure 3:
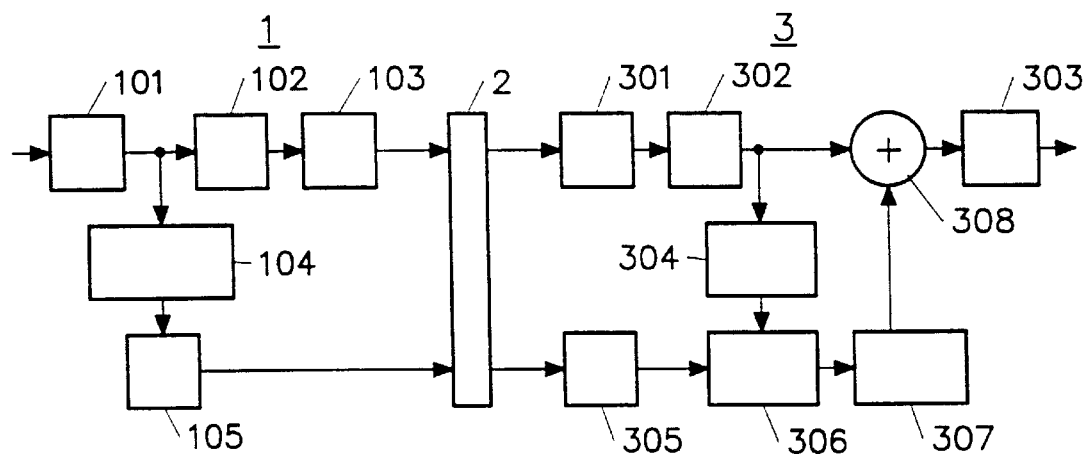
FIGS. 3 and 4 show more detailed embodiments of the system shown in FIGS. 1 and 2, respectively.

In the hybrid encoder 1 of FIG. 3, the waveform encoder comprises a transform circuit 101, a quantizer 102 and a variable-length coder 103. Such a waveform encoder is generally known and described, for example, in "On Adaptive DCT Coding Techniques for Digital Video Recording", IERE Proc., 7th Int. Conf. Video, Audio & Data Recording, 22–24 March, York (UK), pp.199–204. Hereinafter, a Lapped Orthogonal Transform (LOT) is assumed to be used. The LOT transforms overlapping blocks of 2M*2N pixels into blocks of M*N coefficients. The overlapping pixel blocks are denoted $p_{i,j}$ in which i indicates the vertical position (i=1..$N_v$) and j indicates the horizontal position j (j=1..$N_h$) of the block in the image. The coefficients are denoted $c_{i,j}[m,n]$ (m=0..M−1, n=0..N−1). For a more complete description of the LOT, reference is made to "The LOT: Transform Coding Without Blocking Effects", IEEE Trans. on Acoustics, Speech, and Signal Processing, Vol.37, No.4, April 1989.

Figure 5:
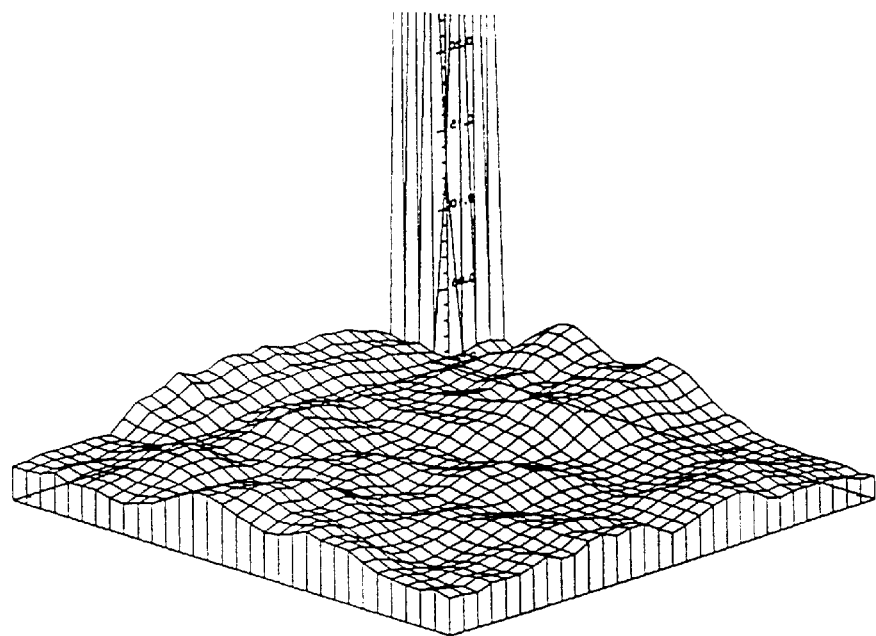
FIGS. 5–7 show amplitude spectrums to illustrate the operation of the system shown in FIGS. 3 and 4.
Figure 6:
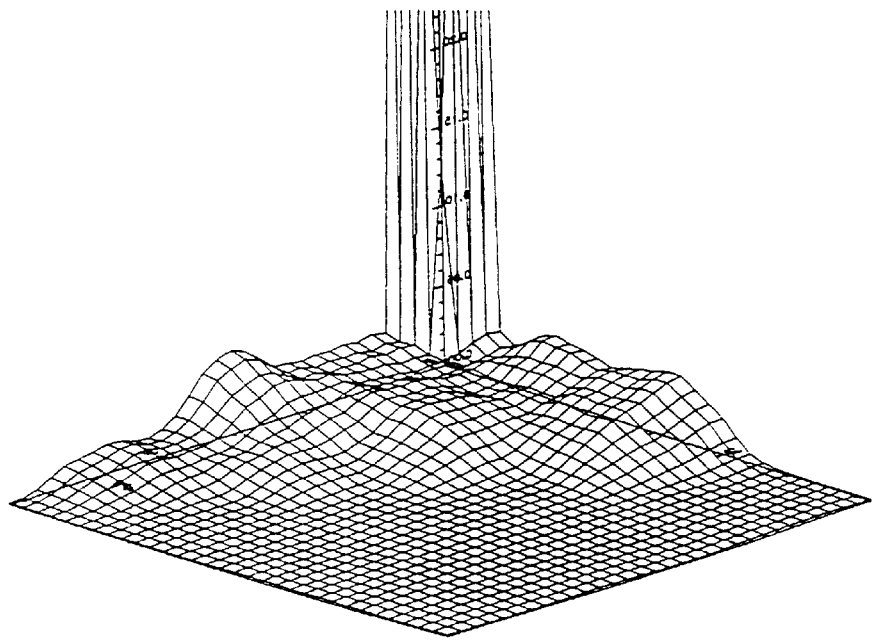

FIG. 5 shows a typical amplitude spectrum (square root of the average energy as a function of the spectral frequency) of an original X-ray image. The square values of transform coefficients represent the energy and show a similar distribution. FIG. 6 shows the spectrum after waveform encoding and decoding. The loss of most of the high-frequency information can clearly be observed. The system shown in FIG. 3 substitutes the lost energy at these frequencies for noise generated at the decoder side.

Figure 7:
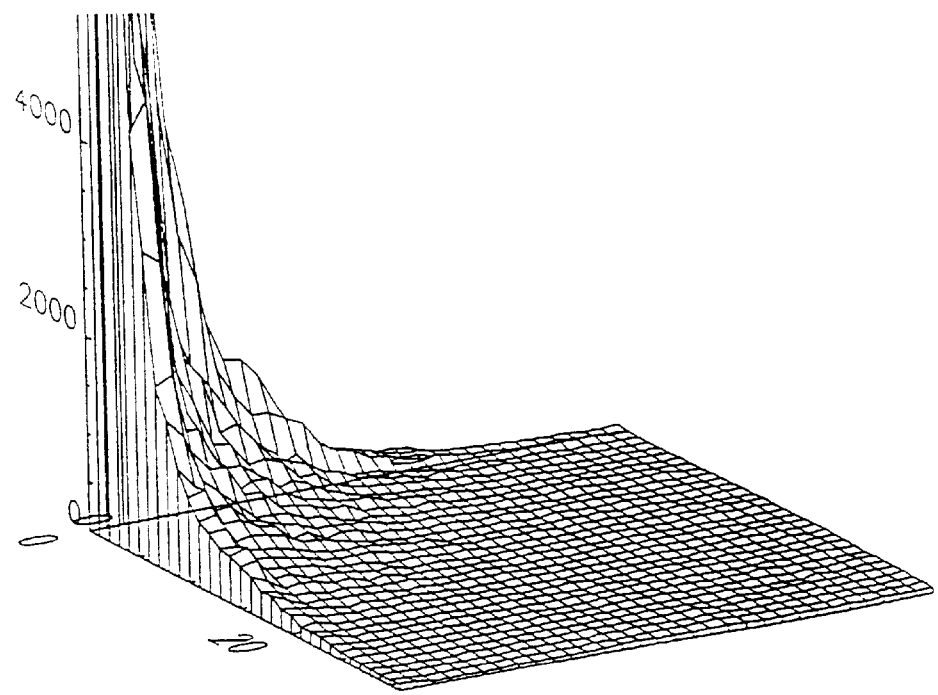

The model-based encoder in FIG.3 comprises transform circuit 101, an estimation circuit 104, and encoding stage 105. Estimation circuit 104 first calculates, for the current image, the energy of all transform coefficients $c_{i,j}[m,n]$, except the DC coefficient $c_{i,j}[0,0]$, in accordance with.

$$\sigma^2[m,n] = \frac{1}{N_h \cdot N_v}\sum_{i=1}^{N_h}\sum_{j=1}^{N_v}(c_{i,j}[m,n])^2 \qquad \text{Eq.1}$$

where it has been assumed that the mean value of $c_{i,j}[m,n]$ is equal to zero. The total MN−1 energies $\sigma^2[m,n]$ give an indication of how the energy in the original image is distributed among the different spatial frequencies. The energies $\sigma^2[m,n]$ are lossless coded by encoding stage 105, by well-known differential coding and variable-length coding techniques. The bitrate required is small as compared with the total number of bits required for the quantized transform coefficients. For images of resolution 512*512 pixels, and for M=N=32, $512^2$ quantized transform coefficients have to be transmitted, whereas only $32^2$−1 noise energies are needed. The noise energies thus constitute only about 0.4 % of the total number of parameters. Furthermore, the block of MN−1 noise energies looks rather smooth, as is illustrated in FIG. 7. They can be zigzag-scanned in a similar way, as is known in the art of transform coding, and then differentially coded.

In the hybrid decoder 3 in FIG.3, the waveform decoder comprises generally known circuit elements such as variable-length decoding stage 301, inverse quantizer 302, and inverse transform circuit 303. The model-based decoder comprises estimation circuit 304, decoding stage 305, subtracter 306 and noise generator 307. The transform coefficients applied to estimation circuit 304 are denoted $\hat{c}_{i,j}[m,n]$.

Estimation circuit 304 calculates the energies $\hat{\sigma}^2[m,n]$ of the reconstructed coefficients $\hat{c}_{i,j}[m,n]$ in a similar way as estimation circuit 104 in the encoder. Thus:

$$\hat{\sigma}^2[m,n] = \frac{1}{N_h \cdot N_v}\sum_{i=1}^{N_h}\sum_{j=1}^{N_v}(\hat{c}_{i,j}[m,n])^2 \qquad \text{Eq.2}$$

Decoding stage 305 decodes the energies $\sigma^2[m,n]$ as transmitted by the model-based encoder. Subtracter 306 calculates the difference $$\Delta[m,n]=max(0,\sigma^2[m,n]-\hat{\sigma}^2[m,n]) \qquad \text{Eq.3}$$

In response to the difference signal thus obtained, noise generation circuit 307 produces coefficients representing random noise with a variance $$\sigma_\Delta^2[m,n]=k\cdot\Delta[m,n] \qquad \text{Eq.4}$$

in which k is a constant. The noise coefficients are added by an adder 308 to transform coefficients $\hat{c}_{i,j}[m,n]$, for all pixel block positions i and j.

Optionally, the regeneration of noise may be made dependent on the condition $$p[m,n]>t[m,n] \qquad \text{Eq.5}$$

in which t[m,n] is a predetermined threshold which may depend on the spatial frequencies m and n, and p[m,n] is the percentage of lost energy defined by $$p[m, n] = \frac{\Delta[m, n]}{\sigma^2[m, n]} \cdot 100 \qquad \text{Eq.6}$$

The values of k and t[m,n] can be found experimentally, taking the perceptual similarity of the original and the coded images as a criterion. The constant k may even be chosen to be different for different spatial frequencies m and n.

As a result of the addition by adder 308, new coefficients $\tilde{c}_{i,j}[m,n]$ are generated in accordance with $$\tilde{c}_{i,j}[m, n] = \hat{c}_{i,j}[m,n] + x_{i,j}[m, n] \qquad \text{Eq.7}$$

where $x_{i,j}[m,n]$ represents a sample of a random noise generator with variance $\sigma_A^2[m,n]$, which has a probability density function which is equal as much as possible to that of the noise in the original image.

It is to be noted that the calculation of lost energy is performed in an 'asymmetric way': negative values of $\Delta[m,n]$ are rounded off to zero. This is done because an increase of the energies of the LOT coefficients due to their quantization can never be compensated by adding a random noise signal.

Figure 4:
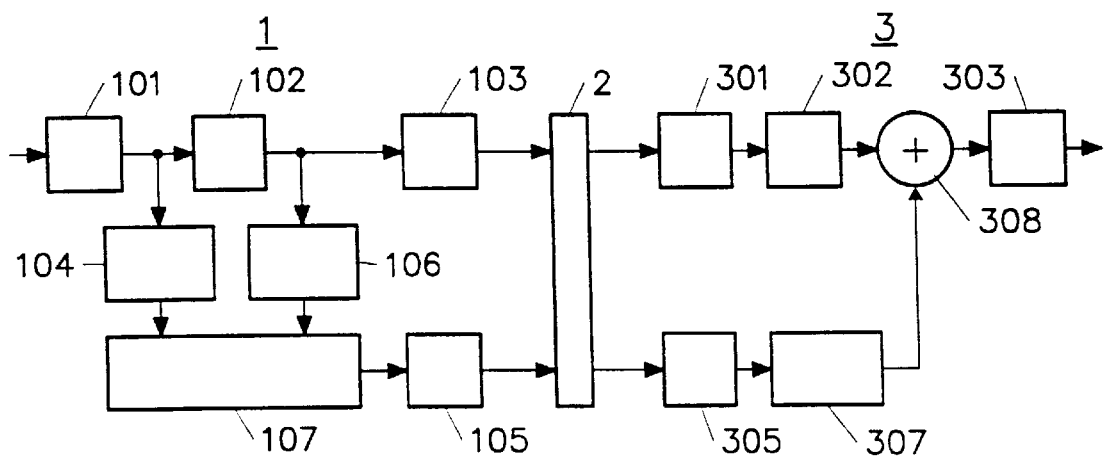

The system shown in FIG. 3 can be transformed into a system which is more similar to the one shown in FIG. 2. This further embodiment is shown in FIG. 4. Estimation circuit 104, already discussed, calculates the energies $\sigma^2[m,n]$ in accordance with Eq. 1. A further estimation circuit 106 calculates the energies $\hat{\sigma}^2[m,n]$ of the coefficients $\hat{\sigma}^2[m,n]$ applied by quantizer 102, in accordance with Eq.2. The random-noise variances $\sigma_A^2[m,n]$ and percentages p[m,n] are now calculated, in accordance with Eqs. 4–6, by a calculation circuit 107 in the encoder instead of in the decoder (setting $\sigma_A^2[m,n]=0$ if p[m,n]<t[m,n]). The random-noise variances $\sigma_A^2[m,n]$ are lossless coded by encoding stage 105 and transmitted to the decoder. In the decoder, the noise generation is performed by decoding stage 305 and noise generator 307, in a similar way as in the system of FIG. 3.

The noise model assumed hereinbefore for the X-ray images is a very simple one. In reality, the noise may not have stationary statistics within an image. It has been observed, for example, that the noise energy depends on the local luminance in the image. Furthermore, it has been observed that the power spectral density of the noise also depends on the local luminance. It changes from rather flat in low-luminance areas to a more low-pass characteristic in high-luminance areas.

Figure 8:
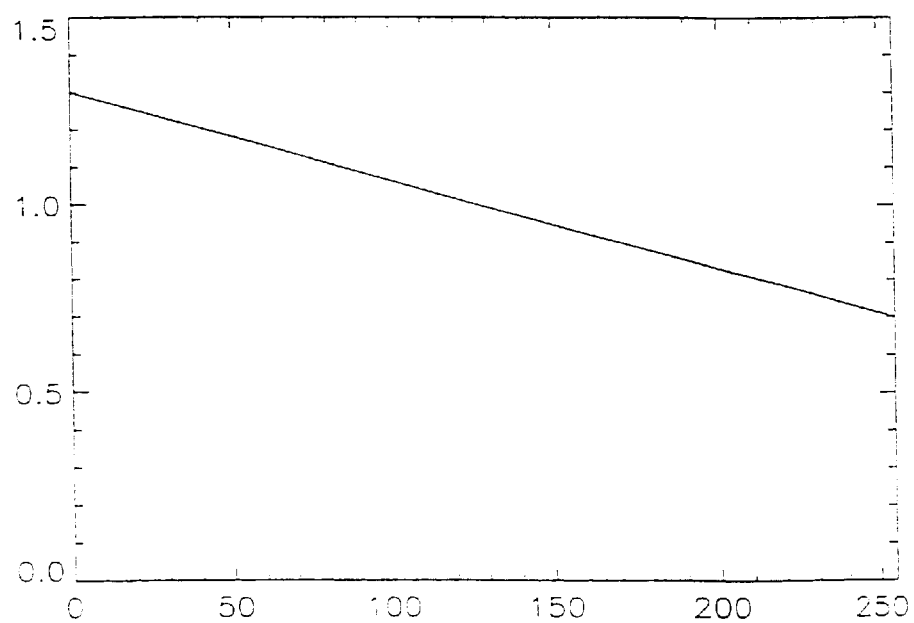
FIG. 8 shows a graph of a luminance-adaptive scaling factor for improving the system shown in FIGS. 3 and 4.

Without noise regeneration, the loss of the noise is most apparent in the low-luminance areas. Simulations have shown that the noise coding method sometimes does not add enough noise in these areas, and too much noise in the bright areas. Of course, for each block of transform coefficients, more detailed information about the shape of the noise spectrum could be transmitted to the decoder. This would, however, significantly increase the bitrate. A fairly simple solution, which does not require an additional bitrate, is to adapt the variance of the noise regenerated in the decoder to the local luminance in the image. As is well-known, the DC coefficient $DC_{i,j} = \hat{c}_{i,j}[0,0]$ represents the mean luminance of the pixel block $p_{i,j}$. Instead of adding noise with a variance $\sigma_A^2[m,n]$, noise is added with variance $$s(DC_{i,j}) \cdot \sigma_A^2[m, n] \qquad \text{Eq.8}$$

in which $s(DC_{i,j})$ is a scaling factor depending on $DC_{i,j}$. FIG. 8 shows an experimentally determined function which has been used to adapt the variance of the noise regenerated in the decoder to the local luminance. In FIG. 8, the vertical axis indicates the scaling factor $s(DC_{i,j})$, whereas the horizontal axis indicates the luminance value.

In summary, a hybrid waveform and model-based image signal encoder and decoder are described. The image signal is waveform-encoded so as to approximate the waveform of the original input signal as well as possible after compression. In order to compensate its loss, the noise component of the signal (or, more generally, a signal component which gets lost by the waveform encoding) is model-based encoded and separately transmitted or stored. In the decoder, the noise is regenerated and added to the waveform-decoded image signal. The invention is particularly applicable to compression of medical X-ray angiographic images, where loss of noise leads a cardiologist or radiologist to believe that the image is distorted.

What is claimed is:

1. A hybrid waveform and model-based encoder for encoding image signals, comprising a waveform encoder for waveform-encoding the image signal and a model-based encoder for model-based encoding a component of the image signal, at least in as far as said component is absent in the waveform-encoded image signal.

2. An encoder as claimed in claim 1, wherein said component is formed by the noise which is present in said image signal.

3. An encoder as claimed in claim 1, wherein the model-based encoder is arranged to encode the power spectral density of the image signal.

4. An encoder as claimed in claim 1, comprising a waveform decoder for decoding the waveform-encoded image signal, means for determining a difference signal between the image signal and the waveform decoded image signal, said difference signal being applied to the model-based encoder.

5. An encoder as claimed in claim 1, comprising a transform arrangement for transforming the image signal into coefficients, wherein the model-based encoder is arranged to apply model-based encoding to said coefficients.

6. An encoder as claimed in claim 4, wherein the model-based encoder is arranged to encode the variance of the noise in said difference signal.

7. A hybrid waveform and model-based decoder for decoding image signals, comprising a waveform decoder for decoding a waveform-encoded version of the image signal, a model-based decoder for decoding a model-based encoded version of the image signal, means for determining to what extent a component of the image signal is absent in the waveform-decoded image signal, and means for adding said missing component to the waveform-decoded image signal.

8. An decoder as claimed in claim 7, wherein said component is representative of the noise which is absent in said waveform-encoded signal.

9. An decoder as claimed in claim 7, wherein the model-based decoder is adapted to decode the power spectral density of the model-based encoded image signal.

10. A hybrid waveform and model-based decoder for decoding image signals, comprising a waveform decoder for decoding a waveform-encoded image signal, a model-based decoder for decoding a model-based encoded component which is absent in the waveform-encoded image signal, and means for adding said decoded component to the waveform-decoded image signal.

11. A method of transmitting image signals, comprising the steps of waveform-encoding the image signal, model-based encoding a component of the image signal in as far as said component is absent in the waveform-encoded image signal, transmitting said waveform-encoded image signal and said model-based encoded component, decoding said waveform-encoded image signal and model-based encoded component, and combining said decoded image signal and model-based decoded component.

12. A method as claimed in claim 11, wherein the step of model-based encoding comprises the step of encoding the power spectral density of the image signal.

13. A method as claimed in claim 11, comprising the step of waveform-decoding the waveform-encoded image signal, determining a difference signal between the image signal and the waveform decoded image signal, and model-based encoding said difference signal.

14. A method as claimed in claim 11, comprising the step of transforming the image signal into coefficients, the model-based encoding being applied to said coefficients.

15. A method as claimed in claim 12, wherein the step of model-based encoding is applied to the variance of the noise in said difference signal.

16. A method as claimed in claim 11, wherein said predetermined component is formed by the noise which is present in said image signal.

17. An image signal, comprising a waveform-encoded image signal and a model-based encoded signal representative of at least a predetermined component of the image signal in as far as said component is absent in the waveform-encoded image signal.

18. A storage medium on which an image signal as claimed in claim 17 has been stored.

* * * * *